(12) United States Patent
Okada et al.

(10) Patent No.: US 11,057,596 B2
(45) Date of Patent: Jul. 6, 2021

(54) IMAGE PROJECTION APPARATUS AND ITS CONTROL METHOD

(71) Applicant: CANON KABUSHIKI KAISHA, Tokyo (JP)

(72) Inventors: Yoshiyuki Okada, Sakura (JP); Ryohei Mitazaki, Chikusei (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/724,454

(22) Filed: Dec. 23, 2019

(65) Prior Publication Data

US 2020/0213567 A1  Jul. 2, 2020

(30) Foreign Application Priority Data

Dec. 27, 2018 (JP) .............................. JP2018-244092

(51) Int. Cl.
*H04N 9/31* (2006.01)

(52) U.S. Cl.
CPC ......... *H04N 9/3155* (2013.01); *H04N 9/3188* (2013.01)

(58) Field of Classification Search
CPC ........................ H04N 9/3155; H04N 9/3188
See application file for complete search history.

(56) References Cited

U.S. PATENT DOCUMENTS

| 7,289,114 | B2 | 10/2007 | Damera-Venkata |
|---|---|---|---|
| 10,491,871 | B2 | 11/2019 | Nishizawa |
| 2009/0002297 | A1* | 1/2009 | Sakai ............... G09G 5/395 345/87 |
| 2011/0025875 | A1* | 2/2011 | Imade ............ H04N 5/23232 348/222.1 |
| 2017/0019648 | A1* | 1/2017 | Yamaguchi ......... H04N 7/0132 |

FOREIGN PATENT DOCUMENTS

| JP | 2007500868 A | 1/2007 |
|---|---|---|
| JP | 2007192919 A | 8/2007 |
| JP | 2009118159 A | 5/2009 |
| JP | 2015176019 A | 10/2015 |
| JP | 6070127 B2 | 2/2017 |
| JP | 2017027024 A | 2/2017 |
| JP | 2017169024 A | 9/2017 |
| WO | 2005013256 A2 | 2/2005 |

* cited by examiner

*Primary Examiner* — Michael E Teitelbaum
(74) *Attorney, Agent, or Firm* — Rossi, Kimms & McDowell LLP

(57) ABSTRACT

An image projection apparatus configured to project image light and to display a projection image includes a light modulation element driven according to an image signal and configured to modulate incident light to generate the image light, a shifter configured to shift a plurality of pixels of the projection image by changing an optical path of the image light, and a controller configured to control driving of the shifter. The controller changes a driving method of the shifter according to a frame rate of the image signal.

12 Claims, 9 Drawing Sheets

IMAGE PROJECTION APPARATUS AND ITS CONTROL METHOD

BACKGROUND OF THE INVENTION

Field of the Invention

The present invention relates to an image projection apparatus (referred to as a projector hereinafter) that projects image light generated by a light modulation element and displays a projection image, and more particularly to a projector that can perform a pixel shift.

Description of the Related Art

Some projectors are capable of a pixel shift that apparently improves the resolution of a projection image by optically minutely shifting all pixels of the projection image. Each of Japanese Patent Laid-Open Nos. 2017-169024, 2017-027024 and Japanese Patent No. 6070127 discloses a projector that displays a projection image having a resolution higher than that of a light modulation element by shifting pixels of the projection image for each 0.5 pixel diagonally or laterally and vertically in one frame period.

The optical pixel shift changes the optical path of the image light by driving the plane-parallel plate that transmits the image light from the light modulation element by an actuator so as to change its tilt angle.

However, if the frame rate of the projection image (in other words, the image signal input to the projector) becomes high, the actuator that drives the plane-parallel plate may not be able to support the high frame rate. If the response of the actuator is late for the frame rate, the projection image blurs and degrades the image quality. In some cases, the pixel shift is unavailable due to the relationship between the frame rate of the image signal and the frame rate to which the light modulation element can respond.

SUMMARY OF THE INVENTION

The present invention provides a projector that can display a high-resolution and high-quality projection image using a pixel shift.

An image projection apparatus according to one aspect of the present invention configured to project image light and to display a projection image includes a light modulation element driven according to an image signal input from outside and configured to modulate incident light to generate the image light, a shifter configured to shift a plurality of pixels of the projection image by changing an optical path of the image light, and a controller configured to control driving of the shifter. The controller changes a driving method of the shifter according to a frame rate of the image signal.

A control method according to another aspect of the present invention of an image projection apparatus that includes a light modulation element driven according to an image signal input from outside and configured to modulate incident light to generate image light, and a shifter configured to shift a plurality of pixels of a projection image formed by the image light by changing an optical path of the image light includes a step of acquiring a frame rate of the image signal, and a control step of changing a driving method of the shifter according to the frame rate. A non-transitory computer-readable storage medium storing a computer program that causes a computer in an image projection apparatus to execute the above control method also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
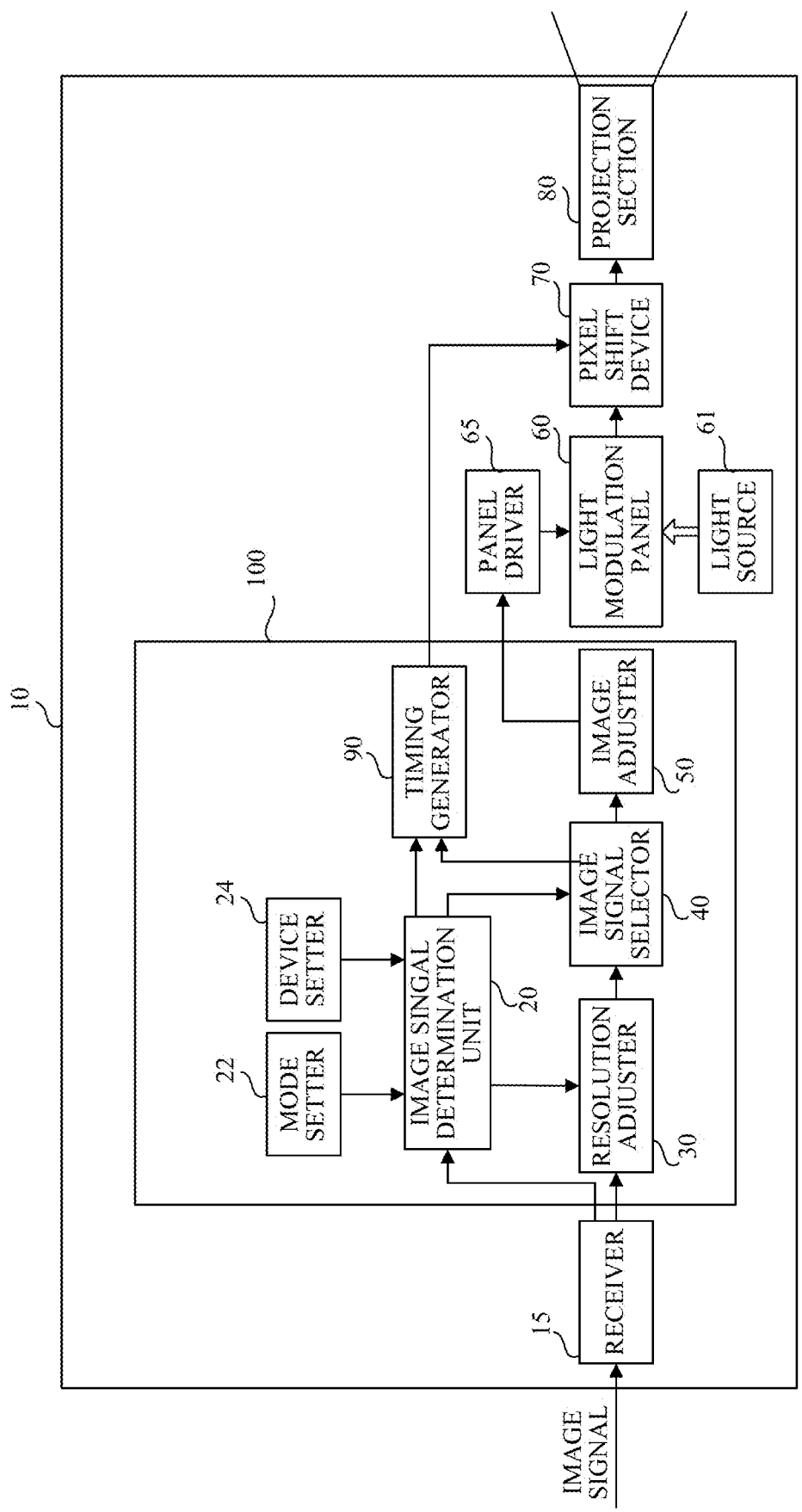
FIG. 1 is a block diagram illustrating a configuration of a projector according to a first embodiment of the present invention.

FIG. 1 illustrates a configuration of a projector 10 as an image projection apparatus according to a first embodiment of the present invention. A receiver 15 receives an image signal input from an external source device such as a personal computer (not shown) and a DVD player. The image signal is a signal conforming to a standard such as HDMI and DisplayPort. The image signal includes information on the resolution and the frame rate. An unillustrated memory included in the receiver 15 stores information as EDID (Extended Display Identification Data) on the manufacturer, model, serial number, and manufacturing time of the projector 10, and the information on the resolution and frame rate that the projector 10 can support. This EDID is transmitted to the external source device. The external source device transmits an image signal in a format suitable for the projector 10 based on the received EDID.

The resolution (number of pixels) of the image signal includes 1280×720, 1920×1200, 1920×1080, 2560×1440, 3840×2160 (4K), 4096×2160, 5120×2880 (5K), 7680×4320

(8K), etc. The frame rate of the image signal includes 24 fps (frames per second), 30 fps, 60 fps, 120 fps, 144 fps, 240 fps, and the like.

The image signal received by the receiver 15 is input to an image signal processor 100. The image signal processor 100 serving as an image data generator performs various image processing described later for the image signal, and generates image data used to drive a light modulation panel 60 serving as a light modulation element. A detailed configuration of the image signal processor 100 will be described later.

A panel driver 65 drives the light modulation panel 60 based on the image data input from the image signal processor 100. The light modulation panel 60 is a reflection type or transmission type liquid crystal panel, a digital micromirror device, or the like, and has a resolution such as WUXGA (1920×1200 pixels) or FHD (1920×1080 pixels).

The illumination light from a light source 61 including a discharge lamp, LED, laser diode or the like enters the light modulation panel 60. The light modulation panel 60 driven based on the image data modulates the illumination light and generates image light. The image light is projected from a projection section 80 onto a projection surface such as an unillustrated screen via a pixel shift device 70. Thereby, the projection image formed by the image light is displayed on the projection surface.

While FIG. 1 illustrates only one light modulation panel 60, the illumination light may be separated into three colored beams of R (red), G (green), and B (blue), and a light modulation panel may be provided for each colored beam (color light). The colored beam may be sequentially introduced into a single light modulation panel, and each color light may be modulated and projected in a time division manner.

Figure 4:
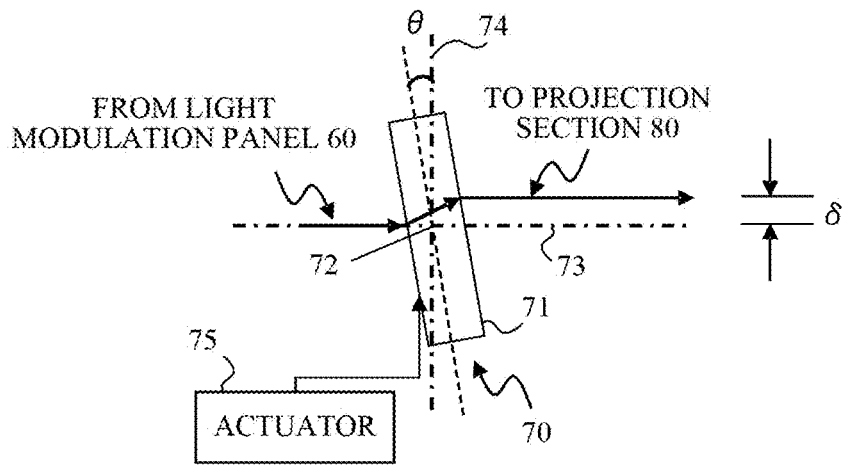
FIG. 4 illustrates a pixel shift device according to the first embodiment.

FIG. 4 illustrates a configuration of the pixel shift device 70. The pixel shift device 70 according to this embodiment includes a plane-parallel plate glass 71 and an actuator 75 that rotates it around an axis 72. When the plane-parallel plate glass 71 is located at a position (referred to as a first position hereinafter) where the incident plane and the exit surface are parallel to a plane 74 orthogonal to a traveling direction 73 of the image light incident from the light modulation panel 60. The image light travels straight through the plane-parallel plate glass 71 and proceeds to the projection section 80. On the other hand, when the plane-parallel plate glass 71 rotates to a position (referred to as a second position hereinafter) where the incident plane and the exit plane incline by an angle θ to the plane 74, the image light is refracted on the incident plane and the exit plane and the optical path is bent as indicated by a solid arrow. As a result, the optical path of the image light emitted from the plane-parallel plate glass 71 shifts by δ from the optical path prior to entering the plane-parallel plate glass 71.

Figure 2:
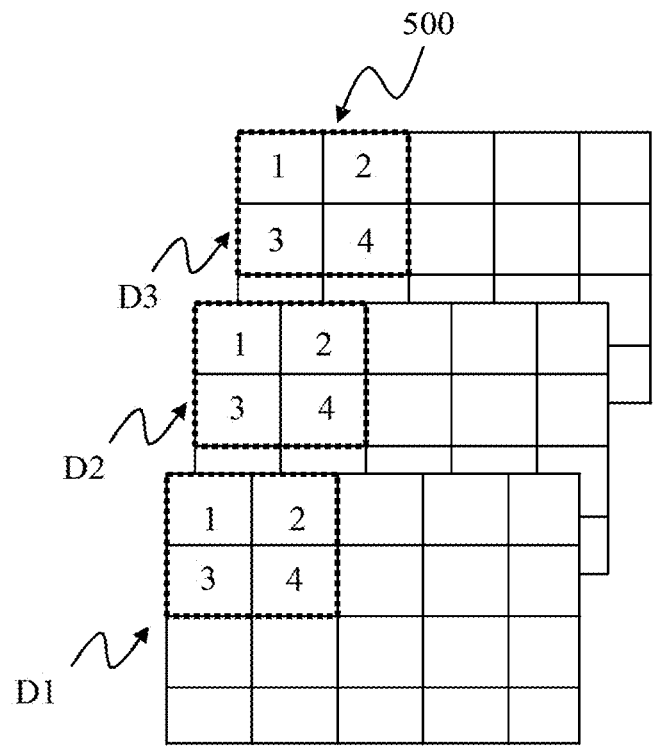
FIG. 2 illustrates frame data in an image signal according to the first embodiment.
Figure 3:
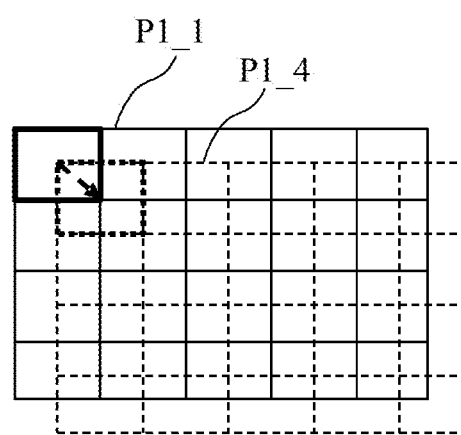
FIG. 3 illustrates a pixel shift according to the first embodiment.

Referring now to FIGS. 2 and 3, a description will be given of the pixel shift performed by the pixel shift device 70. Now assume that the light modulation panel 60 (hereinafter referred to as panel resolution) has a resolution of FHD (1920×1080 pixels), and the resolution of an image signal input from the external source device (referred to as input resolution hereinafter) is 4K (3840×2160 pixels) that is four times as high as the panel resolution. The image signal processor 100 divides one frame period of the image signal into two subframe periods, and generates two subframe image data from frame image data that is image data for the one frame period. The panel driver 65 drives the light modulation panel 60 based on one subframe image data in each subframe period.

FIG. 2 illustrates illustrative frame image data of a 4K image signal. D1 denotes first frame image data, D2 denotes second frame image data, and D3 denotes third frame image data. When the frame rate of the image signal is 60 fps, which is a normal frame rate, the frame image data is updated every 16.6 ms, which is one frame period. When the frame rate of the image signal is 120 fps, which is one of high-speed frame rates higher than the normal frame rate, the frame image data is updated every 8.3 ms that is one frame period.

In each frame image data, an area 500 enclosed by a thick broken line indicates a pixel data area used to drive one pixel of the light modulation panel 60. The 4K image signal has a resolution that is twice as high as the FHD panel resolution in each of the vertical and horizontal directions. Thus, the frame image data has four pixel data labelled by "1," "2," "3," and "4" for one pixel of the light modulation panel 60. In this embodiment, the image signal processor 100 generates subframe image data having only "1" pixel data and subframe image data having only "4" pixel data among one frame image data.

When the subframe pixel data is generated using the "1" and "4" pixel data, not only "1" and "4" but also surrounding pixel data "2" and "3" may be used to generate the subframe pixel data through the image processing.

FIG. 3 illustrates a shift of all pixels (a plurality of pixels) in the projection image when the pixel shift is performed by the pixel shift device 70. A solid line grid represents a subframe projection image P1_1 as a projection image when the light modulation panel 60 is driven based on the subframe image data composed only of the "1" pixel data in the frame image data D1 in FIG. 2. A broken line grid indicates a subframe projection image P1_4 as a projection image when the light modulation panel 60 is driven based on the subframe image data including only the "4" pixel data in the frame image data D1.

An area enclosed by a thick solid line in the subframe projection image P1_1 and an area enclosed by a thick broken line in the subframe projection image P1_4 are areas corresponding to the pixel data area 500 in the frame image data D1 illustrated in FIG. 2, and illustrate one pixel in the subframe projection images P1_1 and P1_4.

As illustrated in FIG. 3, this embodiment shifts the pixel position of the subframe projection image 4 to the lower right direction (the pixel diagonal direction) by 0.5 pixels relative to the pixel position of the subframe projection image 1 by driving the pixel shift device 70. Thus, a user who observes two subframe projection images that are shifted and overlap each other by the pixel shift visually recognizes the one-frame projection image having a resolution higher than that of each subframe projection image or the panel resolution due to a visual averaging action. By similarly performing the pixel shift of the subframe projection image in each frame, the observer can observe a projection image (video) having a resolution apparently higher than that of the panel resolution.

Next follows a description of a configuration and operation of the image signal processor 100 illustrated in FIG. 1. As described above, the image signal processor 100 serves as a controller as well as an image data generator.

A device setter 24 stores information on the projector 10 similar to the EDID. For example, it stores information such as the resolution (panel resolution) of the light modulation panel 60 and a supportable frame rate (referred to as a panel frame rate hereinafter). The mode setter 22 sets a resolution priority mode as a display mode that gives priority to the resolution of the projection image according to an operation input by the user, and outputs information indicating whether or not the resolution priority mode is set. On the basis of information from the device setter 24, information from the mode setter 22, and the EDID from the receiver 15, the image signal determination unit 20 determines whether or not to perform the pixel shift and processing for executing the pixel shift. An image adjuster 50 performs an image quality adjustment such as a color adjustment, a gamma adjustment, and a white balance adjustment for the image data, and outputs the image data after the image quality adjustment to the panel driver 65.

Referring now to a flowchart in FIG. 5, a description will be given of processing performed by the image signal processor 100 including determination processing performed by the image signal determination unit 20. The image signal processor 100 serving as a computer executes this processing according to a computer program.

In the Step-10, the image signal processor 100 (image signal determination unit 20) acquires information on the resolution (input resolution) and frame rate (referred to as an input frame rate hereinafter) of the input image signal from the receiver 15. The image signal determination unit 20 acquires information on the panel resolution and panel frame rate from the device setter 24.

Next, in the Step-30, the image signal processor 100 (image signal determination unit 20) determines whether the input frame rate is the high-speed frame rate or the normal frame rate. If it is the high-speed frame rate, the flow proceeds to the Step-40, and if it is the normal frame rate, the flow proceeds to the Step-50.

In the Step-40, the image signal processor 100 checks whether or not the resolution priority mode is set in the mode setter 22. If the resolution priority mode is set, the image signal processor 100 proceeds to the Step-42 via the Step-41. On the other hand, when the resolution priority mode is not set, the image signal processor 100 proceeds to the Step-44 via the Step-43. Also in the Step-50, the image signal processor 100 confirms whether or not the resolution priority mode is set. If the resolution priority mode is set, the flow proceeds to the Step-52 via the Step-51. When the priority mode is not set, the flow proceeds to the Step-54 via the Step-53.

In the Step-41 and the Step-51, the resolution adjuster 30 in the image signal processor 100 adjusts the resolution by scaling up or down the image signal from the receiver 15 and generates the image signal having the resolution of 4K (or image signal having the resolution higher than that of the light modulation panel 60). The image signal having the resolution adjusted to 4K is input to the image signal selector 40. In the Step-42 and the Step-52, the image signal processor 100 performs processing described later.

In the Step-43 and the Step-53, the image signal processor 100 (resolution adjuster 30) scales up or down the image signal from the reception unit 15 through the scale adjuster 30, adjusts its resolution, and generates an image signal having the resolution that matches the resolution of the light modulation panel 60. In the Step-44 and the Step-54, the image signal processor 100 does not execute the pixel shift (shift OFF).

Figure 6A:
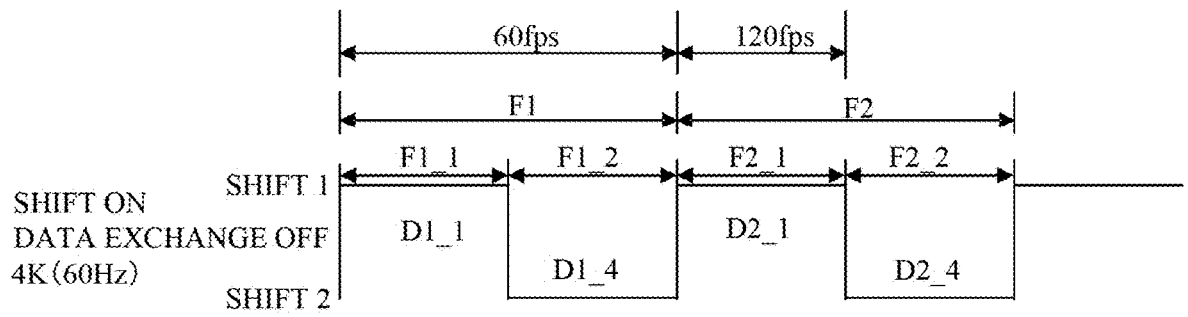
FIGS. 6A to 6D illustrate pixel shift timings according to the first embodiment.
Figure 6B:
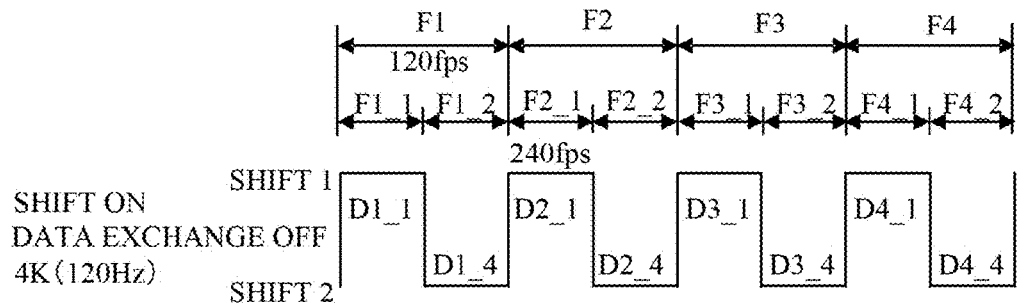
Figure 6C:
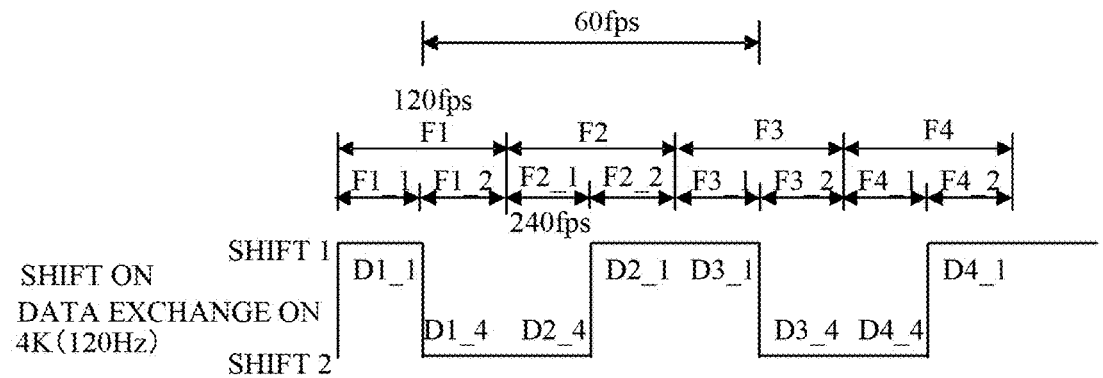

Referring now to FIGS. 6A to 6C, a description will be given of processing performed by the image signal processor 100 in the Step-42 and Step-52 as controlling steps. FIGS. 6A to 6C illustrate an execution or non-execution of the pixel shift according to the input frame rate (shift ON/OFF) and the update of subframe image data used to drive the light modulation panel 60 in executing the pixel shift (data exchange ON/OFF).

In the figure, Fn (n=1 to 4) indicates a frame (or a frame period). Fn_1 and Fn_2 indicate two subframes (or subframe periods) set by dividing each frame into two. Dn_1 and Dn_4 indicate subframe image data corresponding to the pixel shift positions (Pn_1 and Pn_4) of the projection image as the image data used to drive the light modulation panel 60. Dn_1 is the subframe image data composed only of the "1" pixel data in the frame image data Dn illustrated in FIG. 2, and Dn_4 is the subframe image data composed only of the "4" pixel data. Further, "shift 1" in the figure indicates a first position of the pixel shift device 70 (plane-parallel plate glass 71), and "shift 2" indicates a second position.

FIG. 6A illustrates the driving of the pixel shift device 70 and the update of the subframe image data when the input frame rate is 60 fps (first frame rate) and no data exchange described later is performed in the shift ON (data exchange OFF). This corresponds to a case where the input frame rate is the normal frame rate in the Step-30 in FIG. 5 and the image signal processor 100 proceeds to the Step-52 when the resolution priority mode is set in the Step-50. When the resolution priority mode is not set in the Step-50, the image signal processor 100 proceeds to the Step-54 and execute no pixel shift (shift OFF).

As illustrated in FIG. 6A, the image signal processor 100 updates the frame image data every single frame period (F1, F2) of 60 fps which is the input frame rate. The pixel shift device 70 is driven at a driving frequency of 60 Hz corresponding to an input frame rate of 60 fps, and subframe image data is updated which is output so as to drive the light modulation panel 60 every 120 fps for each one subframe period (Fn_1, Fn_2). The update of the subframe image data at this time is performed in the first order (Dn_1→Dn_4).

More specifically, the image signal processor 100 drives the pixel shift device 70 to the first position in the subframe F1_1 in the frame F1 and outputs the subframe image data D1_1, and drives the pixel shift device 70 to the second position in the subframe F1_2 and outputs the subframe image data D1_4. It drives the pixel shift device 70 to the first position in the next subframe F2_1 in the frame F2 to output the subframe image data D2_1, and drives the pixel shift device 70 to the second position in the subframe F2_2 and outputs the frame image data D2_4. The driving method of the pixel shift device 70 illustrated in FIG. 6A will be referred to as a first pixel shift method (first driving method). The pixel shift by the first pixel shift method enables the resolution of the projection image to be higher than that of the panel resolution.

A description will now be given of a response characteristic of the pixel shift device 70. The actuator 75 that rotates the plane-parallel plate glass 71 in the pixel shift device 70 illustrated in FIG. 2 includes a piezoelectric element or the like, and has a response frequency of about 100 Hz that can support the normal frame rate of 60 fps. In other words, the pixel shift device 70 can perform the pixel shift at about 100 fps, which is a frame rate corresponding to the response frequency.

Figure 7A:
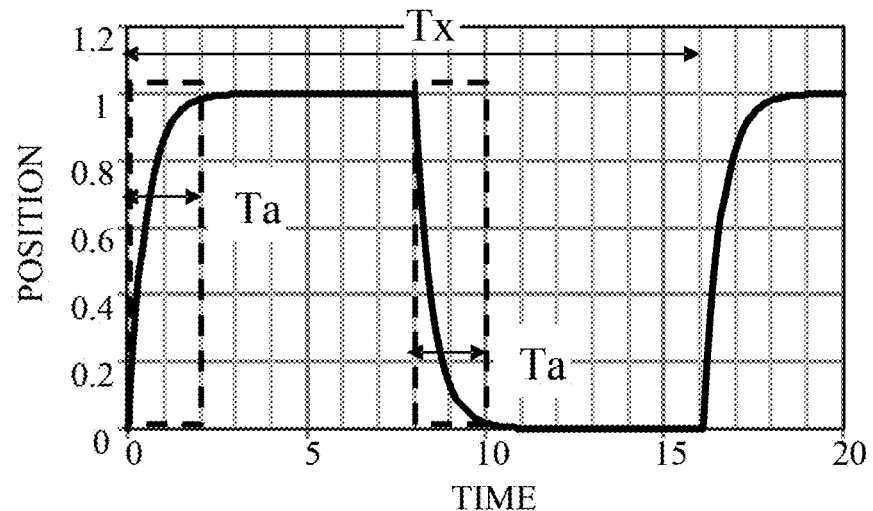
FIGS. 7A and 7B illustrate a response of the pixel shift device according to the first embodiment.

FIG. 7A illustrates a response characteristic of the pixel shift device 70 when the actuator 75 is used. The abscissa axis indicates normalized time, and the ordinate axis indicates the normalized position of the plane-parallel plate glass 71. Tx is a driving cycle of the pixel shift device 70 and corresponds to one frame period (16.6 ms) of an input frame rate of 60 fps. FIG. 7A illustrates the response characteristic of the pixel shift device 70 when the actuator 75 is repeatedly driven to rotate the plane-parallel plate glass 71 from the second position (0) to the first position (1) at time 0 and to hold it until the timing of Tx/2, to again return it to the second position, and to hold it at the second position until the timing of Tx.

While the plane-parallel plate glass 71 is located at the first position (Fn_1) in the period Tx, the light modulation panel 60 is driven using the subframe image data Dn_1 and the subframe projection image Pn_1 is displayed. While the plane-parallel plate glass 71 is located at the second position (Fn_2), the light modulation panel 60 is driven using the subframe image data Dn_4 to display the subframe projection image Pn_4.

In FIG. 7A, a portion enclosed by a broken line indicates a response lag generated in the pixel shift device 70. For example, a ratio of Ta×2 to the period Tx is 81.25%, which is a time when the position of the plane-parallel plate glass 71 is 95% or more of the target position (first and second positions).

Figure 7B:
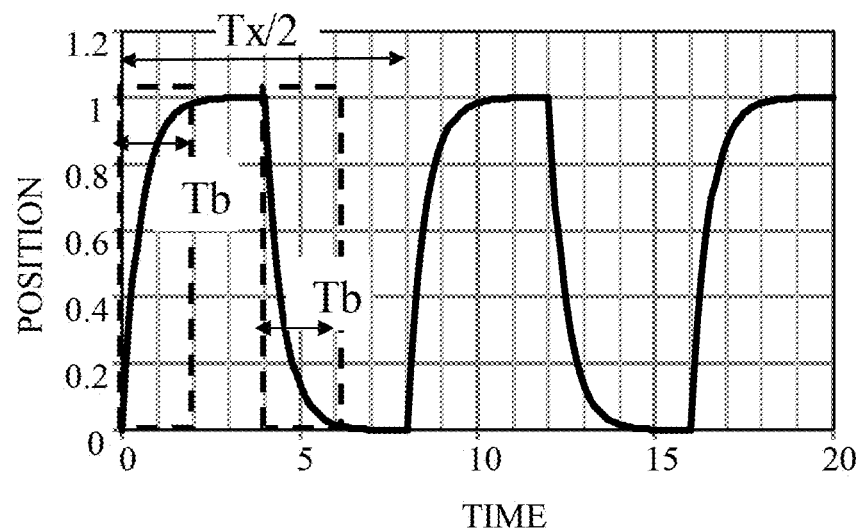

On the other hand, FIG. 7B illustrates a response characteristic of the pixel shift device 70 when the input frame rate is 120 fps or the period is Tx/2. A portion enclosed by a broken line indicates a response lag generated in the pixel shift device 70. In this case, a ratio of Tb×2 to the period Tx/2 is 62.5%, which is an effective time when the position of the plane-parallel plate glass 71 becomes 95% or more of the target position, and the influence of the response lag of the pixel shift device 70 is larger than that in FIG. 7A on the control of rotating and holding the plane-parallel plate glass 71 at the target position. The ratio to the period of the effective time when the position of the plane-parallel plate glass 71 is 98% or more of the target position is 75% in FIG. 7A and 50% in FIG. 7B, and the influence of the response lag of the pixel shift device 70 on the above control is larger.

If the ratio of the effective time period to the period is 75% or more, it is possible to prevent blurring of the projection image. Under this premise, if the pixel shift is performed when the input frame rate is 120 fps, which is the high-speed frame rate, using the actuator 75 that can support the normal frame rate of 60 fps, the response lag becomes remarkable, and the projection image remarkably blurs, and the image quality degrades.

FIG. 6B illustrates the driving of the pixel shift device 70 and the update of the subframe image data when the input frame rate is 120 fps and no data exchange described later is performed in the shift ON (data exchange OFF). The image signal processor 100 updates the frame image data every single frame period (F1 to F4) of 120 fps which is the input frame rate. The pixel shift device 70 is driven at a driving frequency of 120 Hz corresponding to the input frame rate of 120 fps and updates the subframe image data which is output so as to drive the light modulation panel 60 every single subframe period (Fn_1, Fn_2) of 240 fps. The subframe image data at this time is also updated in the first order (Dn_1→Dn_4) similar to FIG. 6A.

More specifically, the image signal processor 100 drives the pixel shift device 70 to the first position in the subframe F1_1 in the frame F1 and outputs the subframe image data D1_1, and drives the pixel shift device 70 to the second position in the subframe F1_2 and outputs the subframe image data D1_4. It drives the pixel shift device 70 to the first position in the next subframe F2_1 in the frame F2 and outputs the subframe image data D2_1. It drives the pixel shift device 70 to the second position in the subframe F2_2 and outputs the frame image data D2_4. Similarly, it drives the pixel shift device 70 to the first position in the subframe F3_1 in the frame F3 and outputs the subframe image data D3_1, and drives the pixel shift device 70 to the second position in the subframe F3_2 and outputs the subframe image data D3_4. It drives the pixel shift device 70 is driven to the first position in the subframe F4_1 in the next frame F4 and outputs the subframe image data D4_1, and drives the pixel shift device 70 to the second position in the subframe F4_2 and outputs the subframe image data D4_4. The driving method of the pixel shift device 70 illustrated in FIG. 6B corresponds to the first pixel shifting method as in FIG. 6A.

When the pixel shift device 70 is driven at a driving frequency of 120 Hz corresponding to the input frame rate of 120 fps and the plane-parallel plate glass 71 is repeatedly rotated between the first position and the second position, as illustrated in FIG. 7B, the response lag becomes remarkable, and it is impossible to support a high-speed frame rate.

Figure 5:
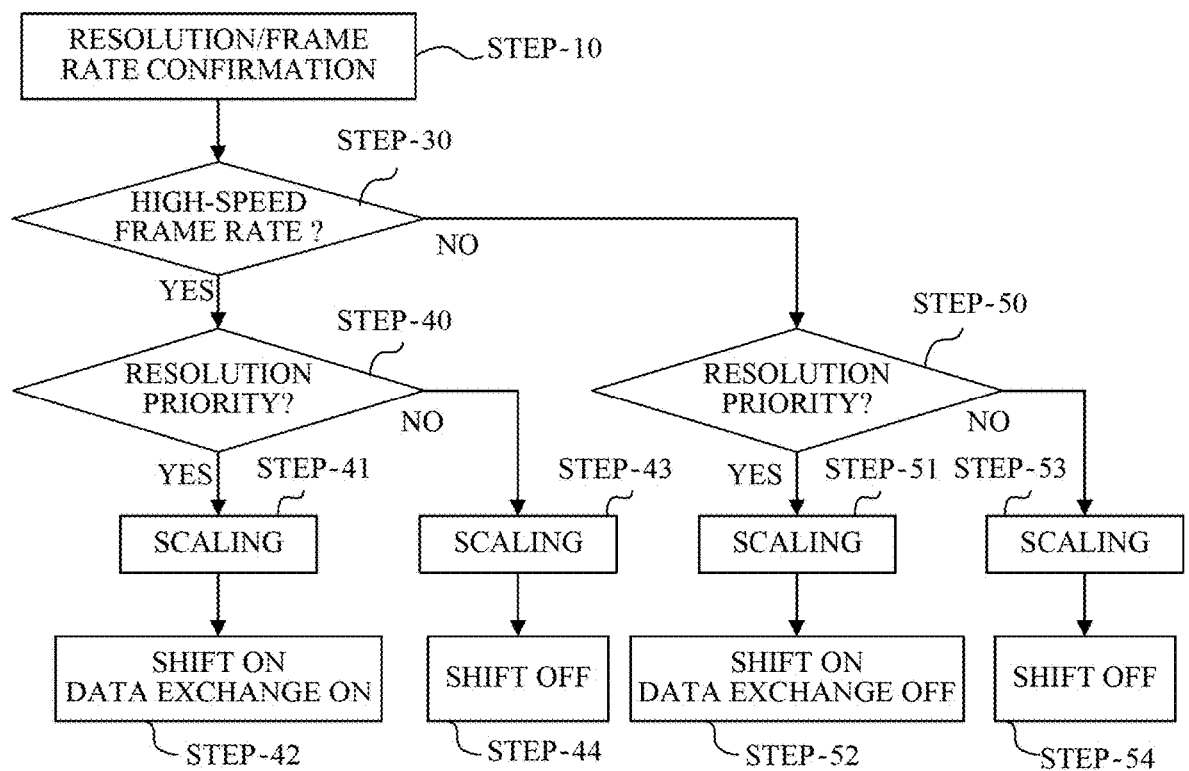
FIG. 5 is a flowchart illustrating image signal determination processing according to the first embodiment.

Accordingly, the image signal processor 100 in this embodiment exchanges the data in the Step-42 in FIG. 5 in the shift ON (data exchange ON). FIG. 6C illustrates driving of the pixel shift device 70 and updating of the subframe image data when the input frame rate is 120 fps in the shift ON and the data exchange ON. The image signal processor 100 updates the frame image data every single frame period (F1 to F4) of 120 fps which is the input frame rate. The pixel shift device 70 is driven at a driving frequency of 120 Hz corresponding to the input frame rate of 120 fps, and the subframe image data is updated which is output so as to drive the light modulation panel 60 every single subframe period that is 240 fps (Fn_1, Fn_2). At this time, the image signal processor 100 drives the pixel shift device 70 every plural (herein two) subframe periods and outputs the subframe image data Dn_1 to be output to the panel driver 65 every single frame period. The order of the subframe image data Dn_1 and Dn_4 is set to the second order (Dn_4→Dn_1) that is different from (opposite to) the first order (Dn_1→Dn_4) in another frame period.

More specifically, the image signal processor 100 drives the pixel shift device 70 to the first position in the subframe F1_1 in the frame F1 and outputs the subframe image data D1_1, and drives the pixel shift device 70 to the second position in the subframe F1_2 and outputs the subframe image data D1_4. This is the same as FIG. 6B. However, the subframe image data D2_4 is output while the pixel shift device 70 is held at the second position in the subframe F2_1 in the next frame F2, and the pixel shift device 70 is driven to the first position in the subframe F2_2 and the subframe image data D2_1 is output. In other words, the data is exchanged. In the subframe F3_1 in the frame F3, the subframe image data D3_1 is output while the pixel shift device 70 is held at the first position, and in the subframe F3_2, the pixel shift device 70 is driven to the second position and the frame image data D3_4 is output. In the next subframe F4_1 in the frame F4, the subframe image data D4_4 is output while the pixel shift device 70 is held at the second position, and in the subframe F4_2, the pixel shift device 70 is driven to the first position, the subframe image data D4_1 is output, and the data is also exchanged herein. The driving method of the pixel shift device 70 illustrated in FIG. 6C will be referred to as a second pixel shift method (second driving method).

Thus, by performing the pixel shift by the second pixel shift method together with data exchange, the drive frequency of the pixel shift device 70 becomes 60 Hz. As a result, even when the input frame rate is a high-speed frame rate (120 fps), the resolution of the projection image becomes higher than the panel resolution while suppressing image quality degradation such as image blur due to the response lag of the pixel shift device 70.

The data exchange is performed when the image signal selector 40 in the image signal processor 100 selects the subframe image data to be input to the panel driver 65 via the image adjuster 50. The timing generator 90 controls the driving timing of the pixel shift device 70 based on the presence/absence of the data exchange and the timing of data exchange.

Figure 6D:
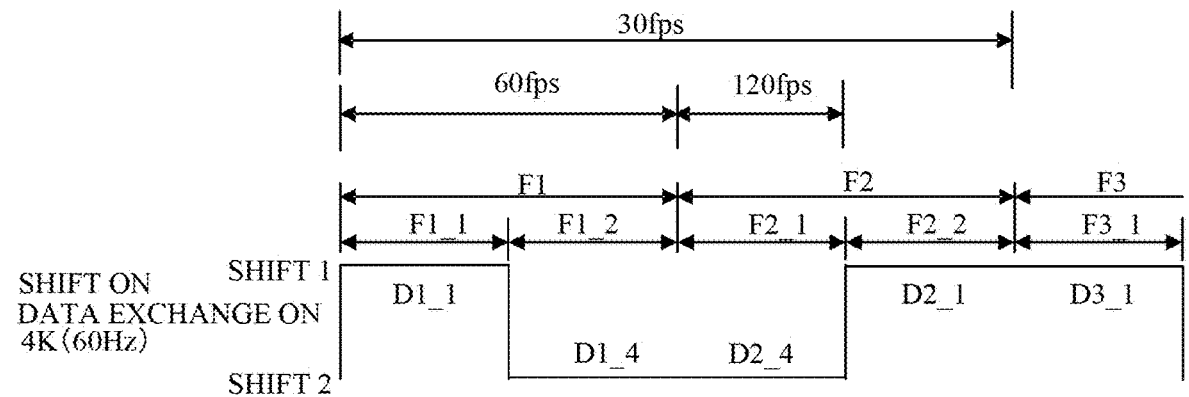

FIG. 6D illustrates driving of the pixel shift device 70 and the update of the subframe image data similar to the Step-42 in the shift ON and the data exchange ON when the input frame rate is 60 fps, different from the Step-52. The image signal processor 100 drives the pixel shift device 70 to the first position in the subframe F1_1 in the frame F1 and outputs the subframe image data D1_1, and drives the pixel shift device 70 to the second position in the subframe F1_2 and outputs the subframe image data D1_4. In the subframe F2_1 in the next frame F2, the subframe image data D2_4 is output while the pixel shift device 70 is held at the second position, and in the subframe F2_2, the pixel shift device 70 is driven to the first position and the subframe image data D2_1 is output. In other words, the data is exchanged. In the subframe F3_1 in the frame F3, the subframe image data D3_1 is output while the pixel shift device 70 is held at the first position.

With this operation, the drive frequency of the pixel shift device 70 becomes 30 Hz. However, the substantial frame rate corresponding to the time interval at which the pixel shift device 70 is driven to the same position among the first and second positions is 120 fps/3=40 fps. Since this is lower than the original input frame rate of 60 fps, the visibility may lower when the projection image is a motion image. When the pixel shift device 70 is similarly driven when the input frame rate is a low frame rate such as 30 fps or 24 fps, the substantial frame rate is reduced down to 20 fps or 16 fps, and the visibility of the motion image is significantly reduced.

Thus, the pixel shift that accompanies the data exchange is undesirable at an input frame rate other than the high-speed frame rate, because it leads to a decrease in the visibility of the motion image. In the pixel shift with the data exchange at the input frame rate of 120 fps that is the high-speed frame rate, the actual frame rate of 240 fps/3=80 fps is higher than the normal frame rate such as 60 fps, and both the motion image visibility and the resolution of the projection image can be improved.

As described above, this embodiment performs the pixel shift by the second pixel shift method together with the data exchange, when the input frame rate is the high-speed frame rate, thereby reducing the drive frequency of the pixel shift device 70, suppressing the image quality deterioration due to the response lag, and improving the resolution. When the input frame rate is not a high-speed frame rate, the pixel shift by the first pixel shift method without the data exchange can improve the resolution without lowering the visibility of the motion image. Therefore, this embodiment can display a high-resolution and high-quality projection image by performing an appropriate pixel shift according to the input frame rate. When the resolution priority mode is not set and the priority is given to the high-speed display of the projection image, the projection image can be displayed without the pixel shift.

Second Embodiment

Figure 8:
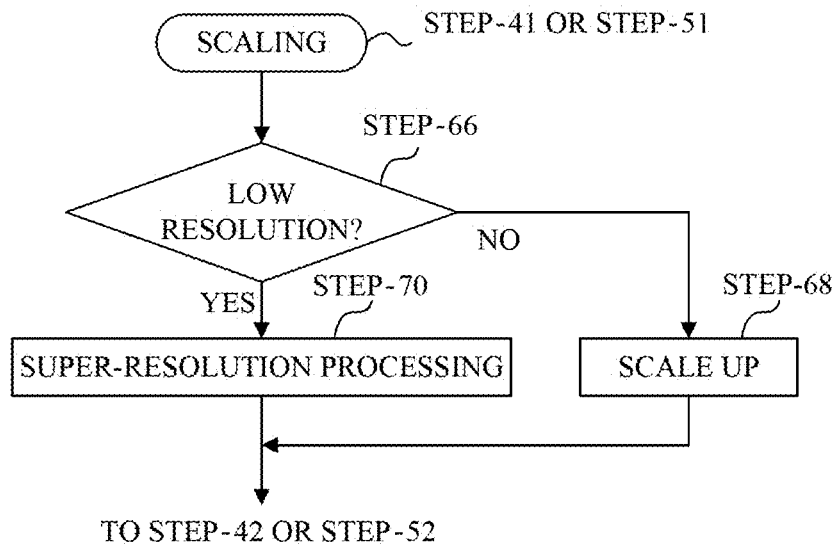
FIG. 8 is a flowchart illustrating image signal discrimination processing according to a second embodiment of the present invention.
Figure 9:
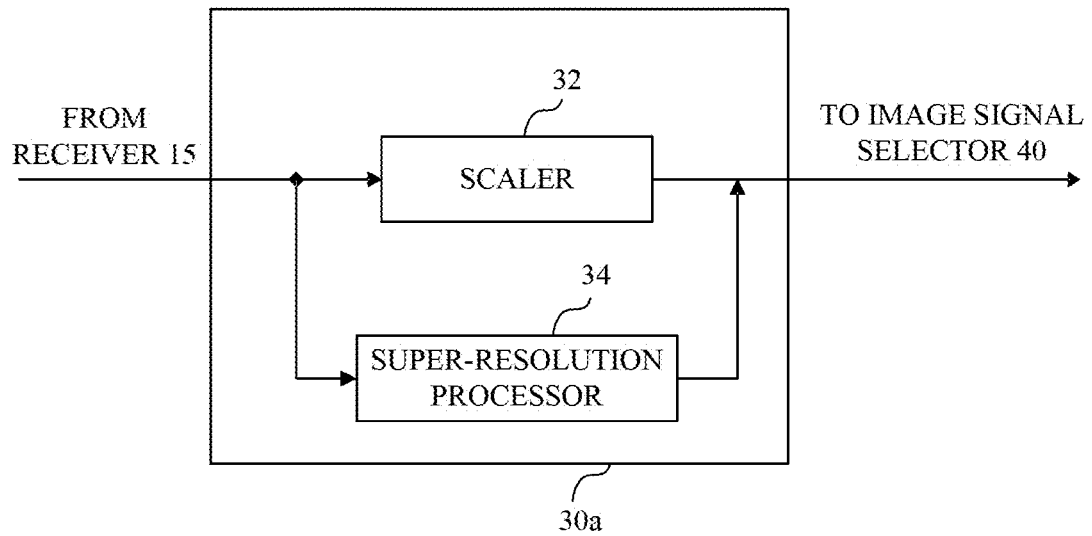
FIG. 9 is a block diagram illustrating a configuration of a resolution adjuster according to the second embodiment.

Next follows a description of a second embodiment according to the present invention. This embodiment replaces the processing of the Step-41 and Step-51 in FIG. 5 described in the first embodiment with processing illustrated in FIG. 8. FIG. 9 illustrates a configuration of the resolution adjuster 30 according to this embodiment.

The image signal processor 100 that has proceeded to the Step-41 or the Step-51 calculates a ratio of the input resolution to the resolution necessary for the pixel shift (or four times as high as the panel resolution corresponding to a predetermined resolution, referred to as a necessary resolution hereinafter) in the Step-66. Then, it determines based on the ratio whether the required resolution is available by the fine adjustment of the input resolution or whether the input resolution is significantly lower than the required resolution. The image signal processor 100 that has determined that the necessary resolution is available by the fine adjustment proceeds to the Step-68, scales up the image signal through the scaler 32 in the resolution adjuster 30a to adjust the resolution, then generates an image signal having a resolution of 4K.

On the other hand, the image signal processor 100 that has determined that the input resolution is much lower than the required resolution proceeds to the Step-70, and performs super-resolution processing for the image signal through the super-resolution processor 34 in the resolution adjuster 30a. An input resolution that is much lower than the required resolution means, for example, that the required resolution (number of pixels) is 1.5 times or more of the input resolution in each of the horizontal direction and the vertical direction. If the difference in resolution is 1.5 times or higher, the image quality is reduced in the scale-up processing, and therefore the super-resolution processing for improving the resolution without reducing the image quality is performed.

The super resolution processing includes intraframe processing and interframe processing. This embodiment performs the intraframe processing for improving the resolution in the frame and generates an image signal (image data) having a necessary resolution (four times as high as the panel resolution). A fine adjustment by scaling up or down may follow an acquisition of a resolution close to the required resolution by the super-resolution processing. The intraframe processing methods include learning-type super-resolution processing that increases the resolution by inferring the input image signal by comparing a learning database and image data with each other, and high-pass filter processing, an edge detection, and nonlinear super-resolution processing using nonlinear processing. Thus, the image signal whose resolution is adjusted to 4K in the Step-70 or the Step-68 is input to the image signal selector 40 illustrated in FIG. 1.

As described above, when the input resolution is significantly lower than the necessary resolution for pixel shift, this embodiment generates an image signal having a resolution corresponding to the necessary resolution by the super-resolution processing. If the input frame rate is the high-speed frame rate, the pixel shift with the data exchange is performed to lower the drive frequency of the pixel shift device 70, to suppress the image quality degradation due to the response lag, and to improve the resolution. When the input frame rate is not the high-speed frame rate, the resolution is improved without reducing the visibility of the motion image by the pixel shift without the data exchange. Thus, even when the resolution of the input image signal is low, this embodiment can display the high-resolution and high-quality projection image through a proper pixel shift according to the input frame rate.

Third Embodiment

Figure 10:
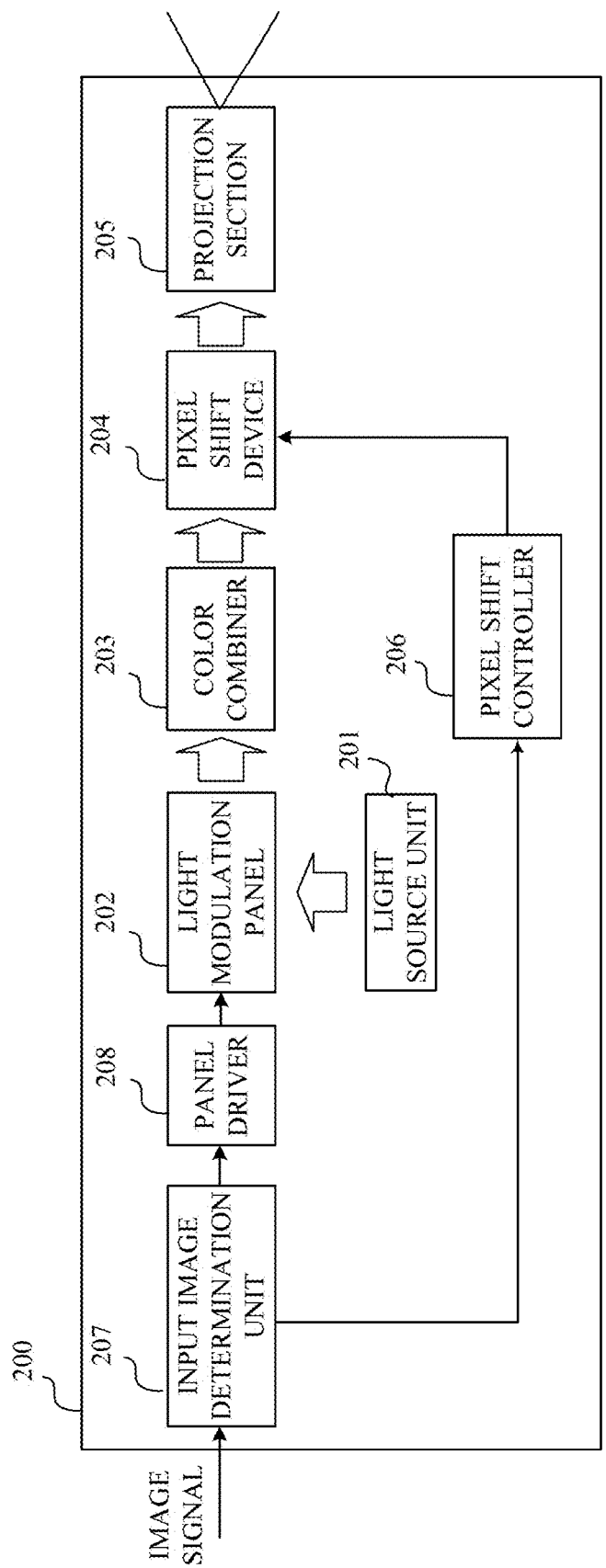
FIG. 10 is a block diagram illustrating a configuration of a projector according to a third embodiment of the present invention.

FIG. 10 illustrates a configuration of a projector 200 according to a third embodiment of the present invention.

The projector 200 includes a light source unit 201, a light modulation panel 202, a color combiner 203, a pixel shift device 204, and a projection section 205. The light source unit 201 includes a discharge lamp, an LED, a laser diode, or the like. The illumination light emitted from the light source unit 201 is collected by an unillustrated illumination optical system including optical elements such as a mirror, a prism, and a lens, and is separated into three colored beams of R, G, and B. The three colored beams enter three (however, only one is illustrated in the figure) light modulation panels 202 provided for respective colored beams.

The projector 200 further includes an input image determination unit 207, a panel driver 208, and a pixel shift controller 206. The input image determination unit 207 receives an image signal from an external source device such as an unillustrated personal computer or a DVD player. The input image determination unit 207 selects a pixel shift method described later, or performs various image processing (scaling, edge enhancement, keystone correction, etc.) for the image signal to generate the image data used for panel driving. The image data is input to the panel driver 208. The input image determination unit 207 corresponds to an image data generator.

The panel driver 208 drives the three light modulation panels 202 based on the image data from the input image determination unit 207. The light modulation panel 202 includes a reflection type or transmission type liquid crystal panel, a digital micromirror device, or the like. The three light modulation panels 202 driven based on the image data modulate three colored beams and generate three colored image beams. The three colored image beams are combined by the color combiner 203 including an optical element such as a prism and a lens and become full-color image light, and are projected from the projection section 205 onto a projection surface such as an unillustrated screen. Thereby, the projection image formed by full-color image light is displayed on the projection surface.

The pixel shift device 204 shifts the optical path of the image light from the optical path before it enters the pixel shift device 204. Thereby, the pixel shift is performed to shift the pixels of the projection image (referred to as projection pixels hereinafter) on the projection surface.

The input image determination unit 207 acquires the resolution (referred to as an input resolution hereinafter) and the frame rate (referred to as an input frame rate hereinafter) from the input image signal. The input image determination unit 207 compares the input resolution with the resolution of the light modulation panel 202 (referred to as a panel resolution hereinafter), selects the pixel shift method by the pixel shift device 204 according to the comparison result, and notifies the pixel shift controller 206 of the selected pixel shift method.

The input image determination unit 207 divides each frame period of the image signal into two or four subframe periods, generates two or four subframe image data from single frame image data that is image data for each frame period, and outputs them to the panel driver 208. The input image determination unit 207 includes an internal buffer that temporarily stores image data, and sequentially outputs the image data from the buffer to the panel driver 208 in synchronization with driving of the pixel shift device 204. The panel driver 208 drives the light modulation panel 60 based on the subframe image data in each subframe period. Thereby, in each subframe period, a projection image (subframe projection image) corresponding to the subframe image data used to drive the light modulation panel 60 is displayed on the projection surface.

Figure 11:
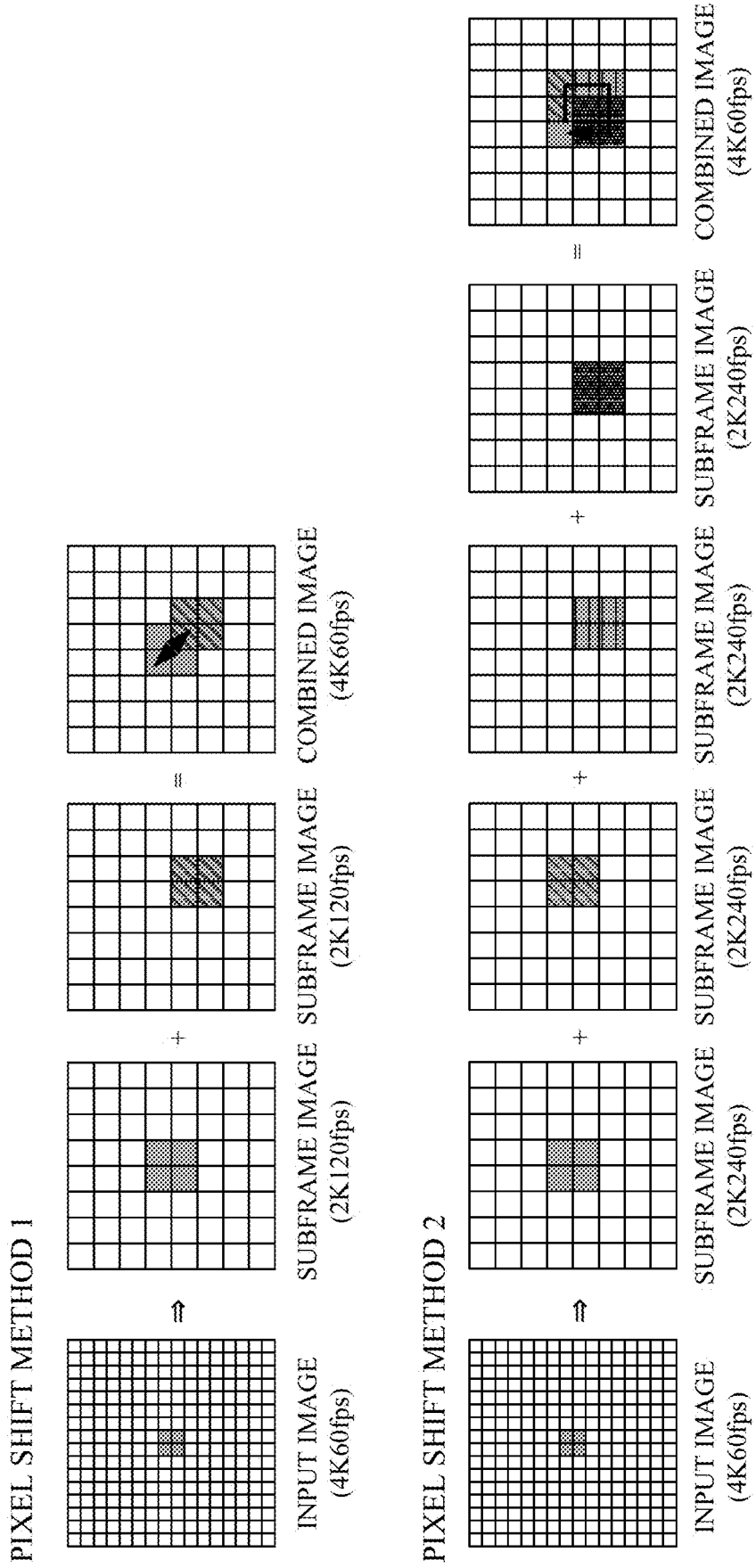
FIG. 11 illustrates a pixel shift method according to the third embodiment.

FIG. 11 illustrates a first pixel shift method (corresponding to the first driving method and referred to as a pixel shift method 1 hereinafter) and a second pixel shift method (corresponding to the second driving method and referred to as a pixel shift method 2 hereinafter) selectable by the input image determination unit 207. Now, in an example, assume that the input video degree is 4K and the input frame rate is 60 fps. In the pixel shift method 1, the input image determination unit 207 generates two subframe image data having a resolution of 2K and a frame rate of 120 fps from single frame image data. In the pixel shift method 2, it generates four subframe image data having a resolution of 2K and a frame rate of 240 fps from single frame image data. The above resolution and frame rate are merely illustrative, and other resolutions and frame rates may be used.

The resolution of the subframe image data depends on the panel resolution. The subframe image data is generally generated by extracting the pixel data of odd-numbered or even-numbered pixel rows and pixel columns in the frame image data. However, the subframe image data may be generated by another method as in the first embodiment. For example, when the input resolution is 4K defined by DCI (Digital Cinema Initiatives) and the aspect ratio does not match as in the panel resolution of WUXGA, the resolution of the subframe image data may be changed by the compression and decompression by scaling processing or the like.

The pixel shift method 1 shifts each projection pixel by 0.5 pixels obliquely or in the 45° direction (diagonal direction of the square pixel) within a single frame period, and again shifts to the original position by 0.5 pixels. In other words, the projection pixel is reciprocally shifted between two (a first number or) shift positions. Thereby, a subframe projection image having the same resolution as the panel resolution can be displayed at a frame rate that is twice as high as the input frame rate. While FIG. 11 illustrates the projection pixels that are diagonally shifted to the lower right, the shift direction may be another direction as long as it is tilted by 45°.

On the other hand, the pixel shift method 2 shifts each projection pixel by 0.5 pixels in the order of right, down, left, and up directions in which the four sides of the square pixel extend within a single frame period. In other words, it periodically shifts the projection pixel between four (a second number of) shift positions that are larger than the shift positions in the pixel shift method 1. Thereby, a subframe projection image having the same resolution as the panel resolution can be displayed at a frame rate that is four times as high as the input frame rate. FIG. 11 illustrates the projection pixels that are shifted in the clockwise direction, but may shift them in the counterclockwise direction.

Thus, by displaying two or four subframe projection images within the single frame period, the observer can observe the combined image as a projection image having the same resolution as the input resolution. In other words, the resolution of the projection image can be made apparently higher than the panel resolution.

In general, the pixel shift methods 1 and 2 described above are realized by tilting the parallel-parallel plate glass through an actuator and by refracting the projection light that has passed through the color combiner.

Figure 13:
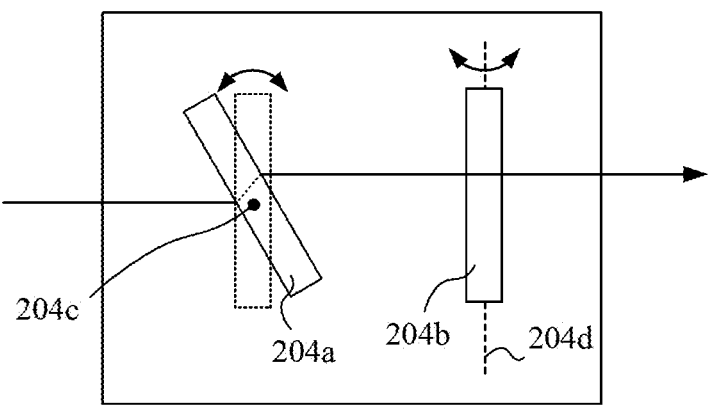
FIG. 13 explain an operation of a pixel shift device according to the third embodiment.

FIG. 13 illustrates a configuration example of the pixel shift device 204 that can realize the pixel shift methods 1 and 2. In the configuration example illustrated in FIG. 13, a plane-parallel plate glass 204*a* and a plane-parallel plate glass 204*b* having translucency are arranged on the optical path of the image light, and these two plane-parallel plate glasses 204a and 204b are tilted (rotated) by an unillustrated actuator around the axes 204c and 204d extending in the orthogonal directions.

Otherwise, another configuration may be adopted which tilts a single plane-parallel plate glass with a plurality of actuators. The configuration may be replaced with a configuration that rotates a prism instead of the plane-parallel plate glass. The optical path may be changed using a birefringent medium such as liquid crystal and a phase modulation element. The optical path may be changed by shifting the projection section 80, or the optical path may be changed by applying the voltage to the nonlinear optical crystal and by varying a refractive index.

The pixel shift method 2 can obtain a higher quality projection image with a higher pixel density than the pixel shift method 1, but requires a higher frame rate. Hence, there are a case where the image projection cannot be performed using the pixel shift method 2 but can be performed using the pixel shift method 1.

Figure 12:
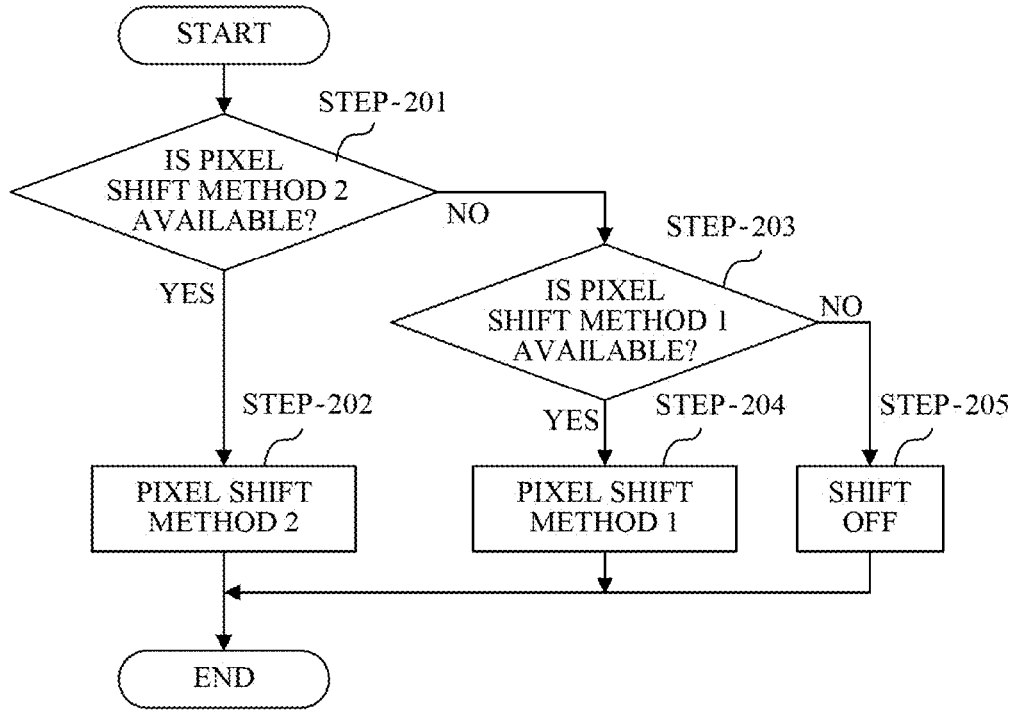
FIG. 12 is a flowchart illustrating pixel shift method selection processing according to the third embodiment.

The flowchart in FIG. 12 illustrates pixel shift method selection processing performed by the input image determination unit 207 that constitutes a controller together with the pixel shift control unit 206. The input image determination unit 207 includes a computer together with the pixel shift control unit 206, and executes this processing according to a computer program.

In the Step-201, the input image determination unit 207 determines whether or not the pixel shift method 2 is available based on the acquired input resolution and input frame rate (whether or not the light modulation panel 202 corresponding to the pixel shift method 2 can be driven). The light modulation panel 202 according to this embodiment has a panel resolution of 2K, and a responsive frame rate (referred to as a panel response frame rate hereinafter) is 240 fps. In this case, a threshold frame rate corresponding to a quarter of the panel response frame rate (a reciprocal of the second number) is 60 fps.

Thus, when the input resolution is 4K and the input frame rate is 60 fps (second frame rate equal to or lower than the threshold frame rate), the light modulation panel 202 corresponding to the pixel shift method 2 can be driven. In this case, the input image determination unit 207 proceeds to the Step-202 and selects the pixel shift method 2. Then, it generates four 2K subframe image data (240 fps) from single frame image data, and outputs them to the panel driver 208. Thereby, a projection image is displayed at a resolution of 4K and a frame rate of 60 fps.

On the other hand, when the input resolution is 4K and the input frame rate is 120 fps (first frame rate higher than the threshold frame rate), the light modulation panel 202 cannot be driven based on the pixel shift method 2. In this case, the input image determination unit 207 proceeds to the Step-203.

In the Step-203, the input image determination unit 207 determines whether the pixel shift method 1 is available based on the input resolution and the input frame rate (whether or not the light modulation panel 202 can be driven based on the pixel shift method 1 can be driven). When the input resolution is 4K and the input frame rate is 120 fps, the light modulation panel 202 can be driven based on the pixel shift method 1. In this case, the input image determination unit 207 proceeds to the Step-204 and selects the pixel shift method 1. Then, it generates two 2K subframe image data (120 fps) from single frame image data, and outputs them to the panel driver 208. Thereby, a projection image is displayed at a resolution of 4K and a frame rate of 60 fps.

When the light modulation panel 202 cannot be driven based on the pixel shift method 1, the input image determination unit 207 proceeds to the Step-205, executes no pixel shift (shift OFF), and ends this flow.

Thus, this embodiment can project an image without reducing the resolution, by selecting a pixel shift method according to the input resolution and the input frame rate.

The above embodiment can display a high-resolution and high-quality projection image by a pixel shift in accordance with a driving method and the frame rate of the image signal.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-244092, filed on Dec. 27, 2018, which is hereby incorporated by reference herein in its entirety.

What is claimed is:

1. An image projection apparatus configured to project image light and to display a projection image, the image projection apparatus comprising:
   a light modulation element driven according to an input image signal and configured to modulate incident light to generate the image light;
   a shifter configured to shift a plurality of pixels of the projection image by changing an optical path of the image light; and
   a controller configured to control a driving of the shifter, wherein the controller selects a driving method of the shifter such that the plurality of pixels of the projection image are shifted by the shifter according to a frame rate of the input image signal, wherein when the frame rate of the input image signal is a first frame rate, the controller controls the driving of the shifter by a same driving method for two successive frame periods, and wherein when the frame rate of the input image signal is a second frame rate different from the first frame rate, the controller controls the driving of the shifter by different driving methods for two successive frame periods.

2. The image projection apparatus according to claim 1, wherein the controller selects a first driving method for driving the shifter for each subframe period set by dividing each frame period of the input image signal into a plurality of subframe periods, when the frame rate is the first frame rate, the first driving method being a method in which the shifter is driven by the same driving method for the two successive frame periods, and wherein the controller selects a second driving method for driving the shifter for each of a plurality of subframe periods, when the frame rate is the second frame rate higher than the first frame rate, the second driving method being a method in which the shifter is driven by the different driving methods for the two successive frame periods.

3. The image projection apparatus according to claim 2, further comprising an image data generator configured to generate subframe image data corresponding to shift positions of the plurality of pixels as image data used to drive the light modulation element for each single subframe period from the input image signal, and to sequentially output the subframe image data, wherein the image data generator outputs the subframe image data in a first order in each frame period of the two successive frame periods when the shifter is driven by the first driving method for the two successive frame periods, and outputs the subframe image data (i) in the first order in one frame period of the two successive frame periods and (ii) in a second order different from the first order in another frame period of the two successive frame periods when the shifter is driven by the second driving method for the two successive frame periods.

4. The image projection apparatus according to claim 3, further comprising a resolution adjuster configured to generate an image signal of a predetermined resolution used to generate the subframe image data from the image signal when a resolution of the input image signal is lower than the predetermined resolution.

5. The image projection apparatus according to claim 2, wherein the first frame rate is lower than a frame rate corresponding to a response frequency of the shifter, and the second frame rate is higher than a frame rate corresponding to the response frequency of the shifter.

6. The image projection apparatus according to claim 1, wherein the controller selects a first driving method for driving the shifter so as to shift the plurality of pixels between a first number of shift positions when the frame rate is the first frame rate, the first driving method being a method in which the shifter is driven by the same driving method for the two successive frame periods, and wherein the controller selects a second driving method for driving the shifter so as to shift the plurality of pixels between a second number of shift positions more than the first number of shift positions when the frame rate is the second frame rate lower than the first frame rate, the second driving method being a method in which the shifter is driven by the different driving methods for the two successive frame periods.

7. The image projection apparatus according to claim 6, wherein the controller drives the shifter so as to shift the plurality of pixels in a diagonal direction of the pixel in the first driving method, and wherein the controller drives the shifter so as to shift the plurality of pixels in a direction in which one of four sides of the pixels extends in the second driving method.

8. The image projection apparatus according to claim 6, wherein the first frame rate is equal to or higher than a threshold frame rate corresponding to a reciprocal of the second number of a frame rate to which the light modulation element can respond, and wherein the second frame rate is equal to or lower than the threshold frame rate.

9. A control method of an image projection apparatus that includes a light modulation element driven according to an input image signal and configured to modulate incident light to generate image light, and a shifter configured to shift a plurality of pixels of a projection image formed by the image light by changing an optical path of the image light, the control method comprising:

acquiring a frame rate of the input image signal; and selecting a driving method of the shifter such that the plurality of pixels of the projection image are shifted by the shifter according to the acquired frame rate of the input image signal, wherein when the frame rate of the input image signal is a first frame rate, the controller controls the driving of the shifter by a same driving method for two successive frame periods, and wherein when the frame rate of the input image signal is a second frame rate different from the first frame rate, the controller controls the driving of the shifter by different driving methods for two successive frame periods.

10. The control method of image projection apparatus according to claim 9, wherein a first driving method for driving the shifter for each subframe period set by dividing each frame period of the input image signal into a plurality of subframe periods is selected when the frame rate is the first frame rate, the first driving method being a method in which the shifter is driven by the same driving method for the two successive frame periods, and wherein a second driving method for driving the shifter for each of a plurality of subframe periods is selected when the frame rate is the second frame rate higher than the first frame rate, the second driving method being a method in which the shifter is driven by the different driving methods for the two successive frame periods.

11. The control method of image projection apparatus according to claim 9, wherein a first driving method for driving the shifter so as to shift the plurality of pixels between a first number of shift positions is selected when the frame rate is the first frame rate, the first driving method being a method in which the shifter is driven by the same driving method for the two successive frame periods, and wherein a second driving method for driving the shifter so as to shift the plurality of pixels between a second number of shift positions more than the first number of shift positions is selected when the frame rate is the second frame rate lower than the first frame rate, the second driving method being a method in which the shifter is driven by the different driving methods for the two successive frame periods.

12. A non-transitory computer-readable storage medium storing a computer program that causes a computer in an image projection apparatus to execute a control method, the image projection apparatus including a light modulation element driven according to an input image signal input and configured to modulate incident light to generate image light, and a shifter configured to shift a plurality of pixels of a projection image formed by the image light by changing an optical path of the image light, the control method comprising:

acquiring a frame rate of the input image signal; and selecting a driving method of the shifter such that the plurality of pixels of the projection image are shifted by the shifter according to the acquired frame rate of the input image signal, wherein when the frame rate of the input image signal is a first frame rate, the controller controls the driving of the shifter by a same driving method for two successive frame periods, and wherein when the frame rate of the input image signal is a second frame rate different from the first frame rate, the controller controls the driving of the shifter by different driving methods for two successive frame periods.

* * * * *